Oct. 17, 1967 C. R. LAUGHLIN, JR., ETAL 3,348,152

DIVERSITY RECEIVING SYSTEM WITH DIVERSITY PHASE-LOCK

Filed March 23, 1964 2 Sheets-Sheet 1

INVENTORS
Vincent J. Di Losa
Charles R. Laughlin, Jr.

ATTORNEYS

DIVERSITY RECEIVING SYSTEM WITH DIVERSITY PHASE-LOCK

Filed March 23, 1964 2 Sheets-Sheet 2

INVENTORS
Vincent J. Di Losa
Charles R. Laughlin, Jr.
[signature] O'Brien
Carl Levy
ATTORNEYS United States Patent Office 3,348,152

Patented Oct. 17, 1967

3,348,152

DIVERSITY RECEIVING SYSTEM WITH DIVERSITY PHASE-LOCK

Charles R. Laughlin, Jr., Silver Spring, and Vincent J. Di Losa, Hyattsville, Md., assignors to the United States of America as represented by the Administrator of the National Aeronautics and Space Administration Filed Mar. 23, 1964, Ser. No. 354,182
13 Claims. (Cl. 325—305)

ABSTRACT OF THE DISCLOSURE

A diversity receiving system having a primary phase-lock loop for utilizing the optimum pre-detected combined signal of the diversity system to insure phase-lock of the system and two secondary phase-lock, coherent automatic gain control loops to adjust the non-combined signals so that they are equal in amplitude and phase coherent. The primary phase-lock loop essentially includes a phase detector for comparing the phase of the optimum combined signal with the phase of a signal from a reference oscillator and a voltage controlled oscillator for utilizing the output from the phase detector so that in accordance therewith the two diversity channels are maintained in phase-lock.

The invention described herein may be manufactured and used by or for the Government of the United States of America for governmental purposes without the payment of any royalties thereon or therefor.

The present invention relates to a diversity receiving system, and, more particularly to an optimum pre-detection diversity combining receiving system having improved signal locking characteristics and adapted for use with amplitude modulation (AM), phase modulation (PM) or narrow band frequency modulation (FM) systems.

In the reception of telemetry or communication signals, wherein fading effects are prevalent, it is usual to include a diversity receiving system. Such a system, by having two receiving channels fed either from orthogonally polarized receiving antennas (polarization diversity) or from two antennas spaced a distance apart (space diversity), insures signal reception close to a theoretical optimum by combining the signals of both channels. For example, in a polarization diversity receiving system, the outputs from the orthogonally polarized antennas are combined to take advantage of any independence which exists in the instantaneous fluctuations in the received signals. In other words, at times when the signal of one polarization is observed to fade to a very low level, the same signal of opposite polarization will generally be at a much higher level. Accordingly, by applying appropriate combining techniques it is possible to obtain better and more reliable reception of the message than can be obtained from either signal alone.

Fundamentally, to properly combine the signals from the receiving channels, it is required that phase coherence between the received signals be automatically maintained in the presence of additive noise, signal disturbances, and/or Doppler shifts. A phase-lock loop is a device capable of performing this function even in the presence of a noise power which greatly exceeds the signal power. Such a phase-lock loop, included as a component part of each receiving channel, heterodynes the incoming signal applied thereto with the signal from a voltage controlled oscillator (VCO) and extracts the necessary phase information from the heterodyned signal in the form of an error voltage. This error voltage is used to control the frequency of the VCO to lock the loop and maintain the heterodyned signal substantially fixed in both frequency and phase. Once the two independent loops of the receiving channels are locked, e.g., to the frequency of a common or reference oscillator, the diversity signals passed thereby can be linearly combined using any of the known diversity combining techniques.

In a system of this type, wherein an independent phase-lock loop is used for each receiving channel, each phase-lock loop is under the individual control of the signal applied thereto. If this signal should fall below threshold, then it is very probable that the loop to which it is applied will lose lock and generally not re-lock. The loop is thus lost from service. In the past, several schemes have been used to overcome this problem. For example, when loss of signal occurs in one of the individual phase-lock loops, the signal path to the combiner from that loop can be interrupted and a memory circuit can be used to hold a voltage controlled oscillator (VCO) of the loop at its last estimated condition. While this is probably the best technique presently in operation, it has the disadvantage that a sizeable threshold must be established so that the memory circuit will remember a strong-signal estimate rather than a weak-signal estimate of the phase of the received signal. Other techniques include: (1) automatically widening the loop bandwidth to increase the capture range thereof, but this has the attendant disadvantage of admitting more noise and possible interfering signals (including sideband components); (2) initiating automatic sweep and search circuitry, but this has the disadvantage of loss of signal while searching; and (3) manual retuning and locking which has obvious disadvantage.

Accordingly, it is an object of the present invention to provide an improved diversity receiving system having an increased probability of maintaining phase-lock.

It is another object of the present invention to provide an improved optimum diversity receiving system having means for utilizing the combined signal therefrom to increase the probability of the entire system to maintain phase-lock.

It is a further object of the present invention to provide an improved optimum pre-detection diversity receiving system having a reduction in the number of manual operations necessary for the system to maintain phase-lock over wide tracking ranges.

These and other objects are carried out by the present invention in which a primary phase-lock loop has applied thereto the combined signal output from the combiner of the diversity receiving system. In this primary phase-lock loop the phase of the combined signal is compared with the phase of a reference signal and an error voltage is developed proportional to the phase difference therebetween. This error voltage is used to vary the frequency of a voltaged controlled oscillator which in turn has its output signal heterodyned in each of the receiving channels with the incoming signal thereof. In this manner the primary phase-lock loop permits the system to track changes common to all the receiving channels so that frequency variations, such as those due to Doppler shifts, are followed. The phase-lock loops of the individual receiving channels (secondary phase-lock loops) compensate for differential changes in the signals in each of the channels and thus assure the phase coherence necessary for combining.

The exact nature of this invention, as well as other objects and advantages thereof, will be readily apparent from consideration of the following specification relating to the annexed drawings in which.

Figures 1, 2:
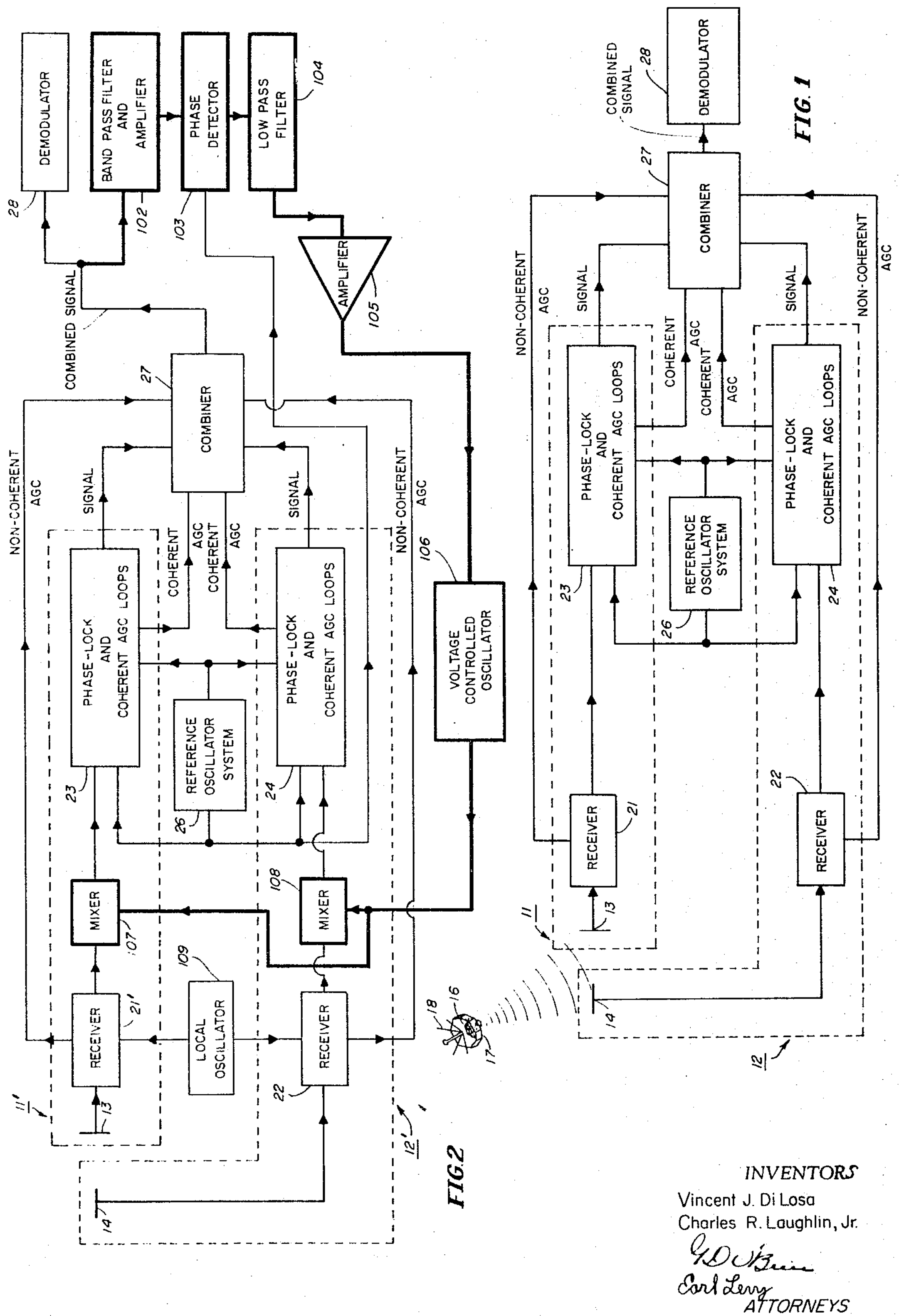
FIGURE 1 shows a block diagram of an optimum diversity pre-detection combining system.
FIGURE 2 shows a block diagram of an embodiment of the present invention.

Referring now to the drawings, wherein like reference characters designate like or corresponding parts throughout, there is shown in FIGURE 1 an optimum pre-detection diversity combining receiving system of a type described in detail in a co-pending patent application, Ser. No. 353,644, filed Mar. 20, 1964, (NASA Case No. 740), entitled, "Optimum Pre-Detection Diversity Combining System." Said patent application is incorporated herein by reference and has been filed by the Administrator of the National Aeronautics and Space Administration. Briefly, this diversity system comprises two independent receiving channels 11, 12, having substantially equal effective receiver noise voltages at the input terminals thereof and having antennas 13, 14, respectively, cross-polarized. The effective receiver noise voltage of each receiving channel is defined as the total receiver noise referred to the input terminals of the receiver and includes the internal noise produced by the initial stages of the radio frequency (RF) amplifier of the receiver and any noise fed to the receiver by the antenna.

A beacon transmitter 16 located in either a stationary object or a moving object such as a spacecraft 17 radiates a linearly polarized signal from radiating antenna 18. By antennas 13, 14 being cross-polarized, the diversity receiving system is assured of receiving the transmitted signal even if its polarization might vary, as for example, when spacecraft 17 is moving such that its attitude is changing and radiating antenna 18 varies in position relevant to receiving antennas 13, 14. While there is always the assurance that the transmitted signal will be picked up by antennas 13, 14, generally, a time variation of the amplitude and phase thereof will usually result in the signals received by receiving channels 11, 12 having unpredictable phase differences and amplitude differences.

So that the signals in both receiving channels will be equal in amplitude and be phase coherent (the condition essential for them to be properly combined), receiving channels 11, 12 include, in addition to antennas 13, 14: heterodyning receivers 21, 22, connected to antennas 13 and 14, respectively, phase-lock and coherent automatic gain control (AGC) loops 23, 24, connected to receivers 21, 22, respectively, and a reference oscillator system 26 connected to phase-lock and coherent AGC loops 23, 24. Each of these receivers, as described in the co-pending patent application referred to hereinabove, includes an independent local oscillator, a radio frequency (RF) amplifier, a mixer and a variable gain intermediate frequency (IF) amplifier. From the mixer—by the signal from the local oscillator being heterodyned therein with the received signal applied via the RF amplifier—there is obtained, as well known in the art, an intermediate frequency (IF) signal which is applied to the variable gain IF amplifier. An independent non-coherent automatic gain control (AGC) circuit, associated with the variable gain IF amplifier, generate, in a well known manner, a non-coherent AGC voltage to vary the gain of the IF amplifier in accordance with the IF signal applied thereto.

The phase-lock and coherent automatic gain control (AGC) loops 23, 24, each includes, as described in the co-pending patent application referred to hereinabove, a phase-lock loop for cooperating with an output signal from reference oscillator system 26 to adjust the phase of the IF signal applied thereto from the receiver to which it is connected, and a coherent automatic gain control (AGC) loop for cooperating with an output signal from reference oscillator system 26 to maintain the signal therefrom at a desired amplitude. By the two phase-lock and coherent AGC loops 23, 24 operating in this manner they each produce an IF signal having the same amplitude and being coherent in phase, but have different noise voltages associated therewith.

The IF total signals (signals and noise voltages associated therewith) and the coherent AGC voltages from phase-lock and coherent AGC loops 23, 24 are applied along with the non-coherent AGC voltages from receivers 21, 22 to novel combiner 27 wherein the IF total signals are weighted by the operation of the AGC voltages in an AGC weighting network thereof according to their respective signal-to-noise ratios (SNR's), prior to combining, so that the IF signal having the greater SNR has more effect upon the SNR of the combined IF signal. A detailed description of the operation of combiner 27 can be found in the copending patent application referred to hereinabove. As pointed out in that patent application, the output from combiner 27, applied to demodulator 28, is a combined IF total signal formed by the addition of the IF total signals from receiving channels 11, 12 after they have been adjusted by the action of the weighting network thereof. This combined IF total signal has a maximum SNR for all values of signals acquired by antennas 13, 14.

The diversity system of FIGURE 1 is shown modified in accordance with this invention by the block diagram of FIGURE 2. Receiving channels 11', 12' therein are different from receiving channels 11, 12 in that they include mixers 107, 108 connected between receiver 21' and phase-lock and coherent AGC loops 23 and between receiver 22' and phase-lock and coherent AGC loops 24, respectively. Mixers 107 and 108, constituting a portion of the present invention to be described in detail hereinafter, replace the direct connection between receivers 21, 22 and phase-lock and coherent AGC loops 23, 24, respectively, of FIGURE 1.

Receiving channels 11', 12' are also different from receiving channels 11, 12 in that a local oscillator 109 is connected to the mixers of receivers 21', 22' to act as a common local oscillator therefor. While a local oscillator in each receiver may be used as discussed above, in connection with FIGURE 1, local oscillator 109 replaces the two independent local oscillators of receivers 21, 22 to better insure that the IF signals from the receivers are frequency coherent.

The primary improvement to the diversity system of FIGURE 1 is the incorporation therein, as shown in FIGURE 2, of a primary phase-lock loop, in addition to the individual phase-lock loops (secondary phase-lock loops) of phase-lock and coherent AGC loops 23, 24, to better insure the probability that the diversity system will maintain phase-lock over wide tracking ranges. This primary phase-lock loop, shown emphasized by heavier construction lines in FIGURE 2, includes a phase detector 103 having connected thereto an output from reference oscillator system 26 (described in connection with FIGURE 1 as cooperating with the secondary phase-lock loops of receiving channels 11, 12); a band-pass filter and amplifier 102 connected between combiner 27 and phase detector 103; a voltage controlled oscillator 106 connected to phase detector 103 via a low-pass filter 104 and an amplifier 105; and mixers 107, 108 connected in receiving channels 11', 12' respectively, (as mentioned above) and having applied thereto the output of voltage controlled oscillator 106.

The combined IF total signal from combiner 27, which is the weighted sum of the IF total signals from the two receiving channels, is applied via band-pass filter and amplifier 102 to phase detector 103 where the phase of the carrier component thereof is compared to the phase of the signal of the reference oscillator system 26. A DC error voltage is generated therefrom in accordance with the variation between the phase of the two signals. This error voltage is applied through low-pass smoothing filter 104 and amplifier 105 to voltage controlled oscillator (VCO) 106 to adjust the frequency of the signal therefrom. The output from VCO 106 is in turn heterodyned in mixers 107, 108 with the IF signals from receivers 21', 22', respectively.

Essentially, any variation in the frequency of the carrier component of the combined total signal from that of the frequency of the signal from reference oscillator system 26 is detected by phase detector 103 and applied as a DC error voltage to VCO 106 to vary the frequency of the signal therefrom such that when the signal from VCO 106 is mixed in mixers 107, 108 with the signals from receivers 21', 22', respectively, the IF signals from the mixers are maintained at a pre-determined frequency. In other words, VCO 106 corrects for any change in the frequency of the combined signal by applying a signal to mixers 107, 108 that follows the change in the frequency. In this manner the VCO corrects the frequency of the signals from mixers 107, 108 so the output from phase detector 103 approaches zero.

The circuit parameters of the primary phase-lock loop and the secondary phase-lock loops are so chosen that the primary phase-lock loop responds faster to changes in the system than the secondary phase-lock loops of the individual receiving channels. For this reason, a small phase difference will instantaneously exist between the output signals from the secondary phase-lock loops until these loops correct this phase difference.

Let it be assumed that all the phase-lock loops of the system are locked. Now, for example, should the received signal in one receiving channel increase in phase, then this change shows up in the carrier component of the combined total signal and is detected by phase detector 103. Phase detector 103 then generates an error voltage proportional to the phase changes and applied it to VCO 106 to correct the frequency of the signal therefrom so that the output signals from mixers 107, 108 are maintained at a pre-determined frequency. Subsequently, the secondary phase-lock loops make their phase corrections so that the output signals of phase-lock and coherent AGC loops 23, 24 are phase coherent for proper combining. The properly combined total signal from combiner 27—the combiner operating, for example, in the manner described in the co-pending patent application referred to hereinabove—is then applied to demodulator 28 for the recovery of the transmitted data information.

Figure 3:
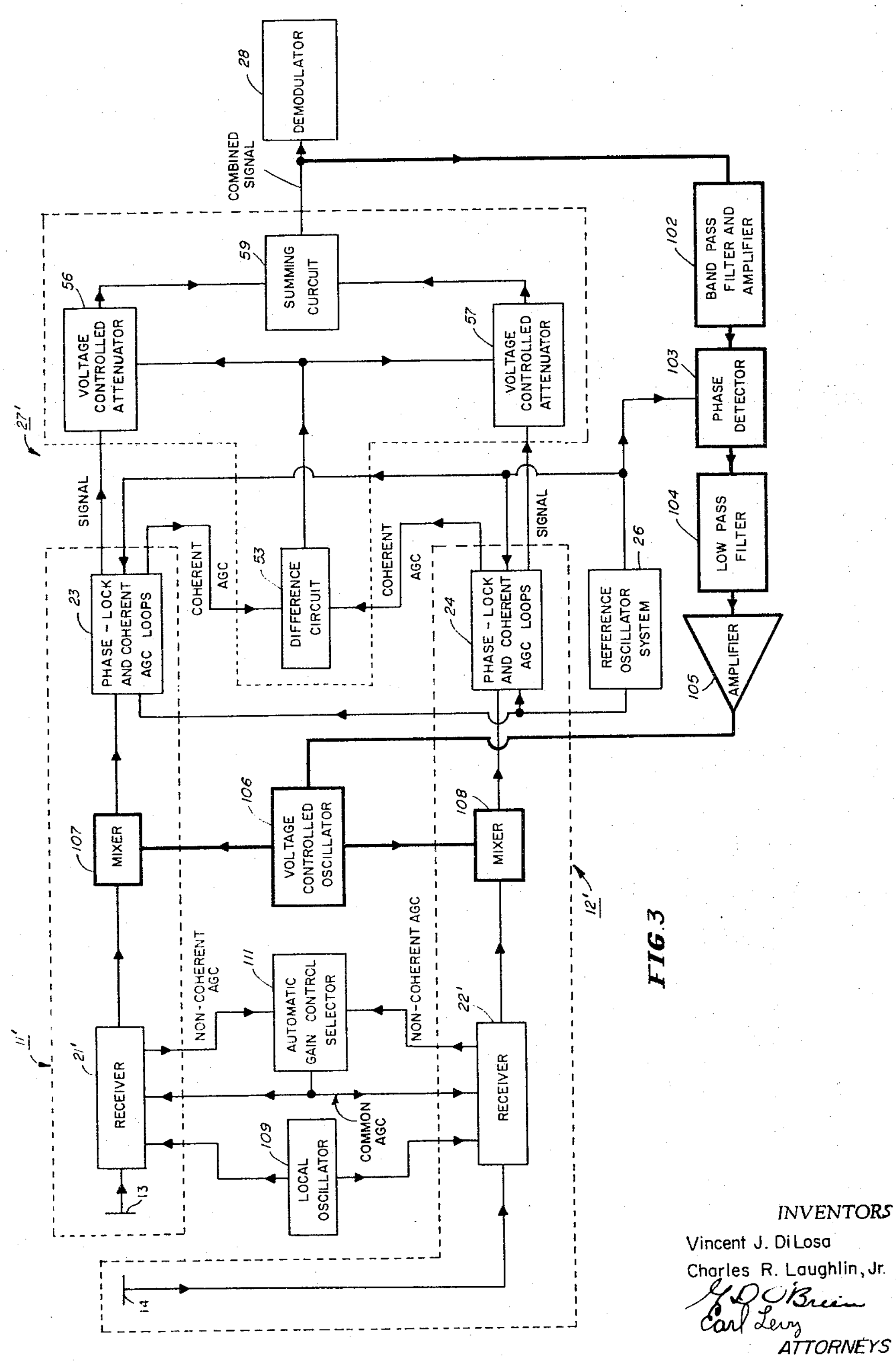
FIGURE 3 shows a block diagram of another embodiment of the present invention.

The diversity system shown in FIGURE 3 operates substantially in the same manner as the diversity system of FIGURE 2 with the exception that receivers 21', 22' also utilize a common automatic gain control (AGC) circuit instead of each receiver having its own non-coherent AGC circuit as was the case in the diversity systems of FIGURES 1 and 2. This common AGC circuit insures that the noise level in the receivers are equal. Since this is so, the weighting function carried out in combiner 27' depends on only the coherent automatic gain control (AGC) voltages generated in phase-lock and coherent AGC loops 23, 24. Accordingly, in the embodiment of the diversity system, shown in FIGURE 3, it is not necessary to sum up the non-coherent AGC voltage with the coherent voltage as was the case in the optimum diversity system of the co-pending patent application referred to hereinabove. Weighing in combiner 27' is carried out by voltage controlled attenuators (VCA's) 56, 57 being controller by a DC control voltage produced by a difference circuit 53—which DC control voltage is merely the difference between the coherent AGC voltages from phase-lock and coherent AGC loops 23, 24. Voltage controlled attenuators (VCA's) 56, 57; difference circuit 53; and summing circuit 59 to which is applied the outputs from the VCA's may be of the type described in the same co-pending patent application.

The following is a brief description of the operation of the common automatic gain control circuit of FIGURE 3. The non-coherent AGC voltages from receivers 21', 22' are derived from the outputs of the variable IF amplifiers thereof, as was the case in FIGURE 1, However, instead of each of them being applied back to the input of the respective IF amplifier with which it was cooperating, now both are applied to an automatic gain control (AGC) selector 111, for example, an OR-gate.

This AGC selector in turn feeds the stronger of the two non-coherent AGC voltages back to the input of both variable gain IF amplifiers of receivers 21', 22' as a common AGC control voltage. Since the effective receiver noise voltage of receivers 21', 22' are assumed to be equal and the same non-coherent AGC voltage is applied to both receivers via common AGC selector 111, the noise voltages of the receivers, while being reduced, are still maintained equal to each other. While the common AGC circuit varies the amplitude of the received signals, the relative amplitude difference therebetween are maintained. The effect of the common AGC is to reduce the dynamic range of absolute signal levels into the phase-lock and coherent AGC loops 23, 24. Accordingly, with the total signals applied to phase-lock and coherent AGC loops 23, 24, having equal noise voltages and unequal signal levels, the coherent AGC voltage derived from each of the receiving channels is the measure of the signal-to-noise ratio (SNR) of the total signal thereof.

In summary, by the prior art diversity combining system failing to utilize the combined total signal for locking, they perform less than optimally under fading signal conditions. For example, should the signal fade in one of the receiving channels, the associated phase-lock loop may very probably lose lock. To recover lock again it is then necessary for an operator to perform a manual adjustment of the VCO in that phase-lock loop of the receiving channel that has lost lock to vary the frequency of the signal therefrom when the signal to that receiving channel returns to strength. An oscilloscope, for example, connected to the phase-lock loop serves as an indicator for lock condition. Since the phase-lock loop of each receiving channel independently tracks only the frequency changes in the receiving channel with which it is associated, a set of manual controls is required for each receiving channel to carry out the above described operation. By using the optimally combined pre-detected signal to control a primary phase-lock loop, only one set of controls is required because the secondary loops automatically correct for phase differences, i.e., once the VCO of the primary phase-lock loop is adjusted to be at the proper frequency the secondary phase-lock loops are automatically corrected.

Of primary importance, however, is the operation of the instant invention under fading signal conditions. For the primary phase-lock loop to lose lock, the SNR in both channels must fall below a given level simultaneously. The probability that the primary phase-lock loop will lose lock is less than the corresponding probability that the channel with the stronger signal will lose lock. Should the signal in one receiving channel fade to a SNR below that required to maintain lock, the primary phase-lock loop will still continue to track the remaining signal so that when the faded signal returns to strength, it will automatically be phase-locked. Accordingly, the overall performance is improved because the probability of losing lock is greatly reduced as compared to the prior art system.

While the invention has been described in connection with a diversity system of the type depicted in FIGURE 1, it will operate equally as well with any similar diversity system. In addition, any number of receiving channels can be employed with the invention by simply incorporating additional weighting and combining circuitry and by the inclusion of a mixer in each additional receiver channel to cooperate with the voltage controlled oscillator (VCO) of the primary phase-lock loop. It should also be understood that while this invention has been described in terms of the received signals having a fixed carrier component, it is equally applicable for use with received signals without a fixed carrier component.

Although the foregoing disclosure relates to preferred embodiments of the invention, it is obvious that numerous modifiactions or alterations may be made therein without departing from the spirit and scope of the invention set forth in the appended claims.

We claim:

1. A diversity-locked combining system for receiving incoming signals comprising: a plurality of receiving channels, each of said plurality of receiving channels having an independent phase controlling means for adjusting the phase of a signal applied thereto; combining means connected to said plurality of receiving channels for combining the signals therefrom; and phase locking means connected to the output of said combining means and to said plurality of receiving channels for using the combined signal from said combining means to insure phase lock of said system.

2. The diversity-locked combining system of claim 1 wherein said phase-locking means comprises: means connected to said output of said combining means for producing an error voltage related to the phase of the combined signal therefrom, a voltage controlled oscillator having said error voltage applied thereto and having the frequency of the output signal therefrom adjusted by said error voltage, and heterodyning means equal in number to said plurality of receiving channels, each of said heterodyning means having applied thereto said output signal from said voltage controlled oscillator and the incoming signal applied to the receiving channel with which it is associated and having an output signal at a predetermined frequency coupled to said phase controlling means of said same receiving channel.

3. A diversity-locked combining system comprising: a plurality of receiving channels, each of said plurality of receiving channels having an independent phase controlling means for adjusting the phase of a signal applied thereto; combining means connected to said plurality of receiving channels for combining the signals therefrom; and means connected to the output of said combining means and to said independent phase controlling means of said plurality of receiving channels for adjusting the frequency of the signals applied to each of said phase controlling means for insuring that the signals applied to said combining means from said plurality of receiving channels are maintained in phase coherence.

4. A diversity-locked combining system having first and second received signals applied thereto comprising: first and second receiving channels for receiving said first and second received signals, respectively; combining means connected to said first and second receiving channels for combining the output signals therefrom to produce a combined signal; phase-locking means connected to said combining means and to said first and second receiving channels; and a reference oscillator, for generating a reference signal, connected to said first and second receiving channels and to said phase-locking means, whereby the signals of said first and second receiving channels are phase locked to said reference signal and said phase-locking means compares said reference signal with said combined signal and develops an output which is coupled to said first and second receiving channels to insure phase lock of said system.

5. A diversity-locked combining system having first and second received signals applied thereto comprising: first and second receiving channels for receiving said first and second received signals, respectively; combining means connected to said first and second receiving channels for combining the output signals therefrom to produce a combined signal, said first and second receiving channels including first and second independent phase controlling means, respectively, for adjusting the phase of the signals applied thereto and for applying their output signals to said combining means; and phase-locking means connected to said combining means and to said first and second receiving channels, said phase-locking means including error producing means connected to said combining means for producing an error voltage relating to the phase of said combined signal, a voltage controlled oscillator having said error voltage applied thereto and having the frequency of the output signal therefrom adjusted by said error voltage, and first and second heterodyning means having applied thereto said output signal from said voltage controlled oscillator, said first and second heterodyning means also having applied thereto said first and second received signals, respectively, and having output signals at pre-determined frequencies coupled to said first and second independent phase controlling means, respectively.

6. The diversity-locked combining system of claim 5, wherein said first and second independent phase control means comprise first and second phase-lock loops connected to said first and second heterodyning means, respectively, for maintaining phase coherence between said output signals therefrom; and wherein said first and second receiving channels comprise first and second receivers connected to said first and second heterodyning means respectively, for applying said first and second received signals thereto.

7. The diversity-locked combining system of claim 6, wherein said first and second phase-lock loops and said error producing means include a common reference oscillator means associated therewith; and wherein said error producing means comprises a band-pass filter and amplifier means having applied thereto said combined signal, a phase detector connected to said reference oscillator means and said band-pass filter and amplifier means to receive the output signals therefrom and produce an error voltage in accordance with the phase difference therebetween, a low-pass filter means connected to said phase detector for soothing said error voltage, and an amplifying means connected between said low-pass filter means and said voltage controlled oscillator for coupling said error signal to said voltage controlled oscillator.

8. The diversity-locked combining system of claim 7 further comprising: a common automatic gain control voltage generating means coupled to said first and second receivers and having said first and second received signals applied thereto, said common automatic gain control voltage generating means including means for selecting the stronger of said first and second received signals and applying said stronger signal as a common automatic gain control voltage to said first and second receivers to vary the gains thereof.

9. In diversity receiving systems having a plurality of receiving channels and a combining means having applied thereto the signals from said receiving channels and having as an output therefrom a combined signal, the improvement comprising: a phase-locking means connected to said combining means and to said plurality of receiving channels, said phase-locking means having said combined signal applied thereto and having as an output therefrom, coupled to said plurality of receiving channels, a signal relating to the phase of said combined signal to insure phase lock of said system.

10. A diversity-locked combining system having first and second receiving signals and comprising: first and second receiving channels having said first and second received signal applied, respectively, thereto, said first and second receiving channel including first and second independent secondary phase-lock loops, respectively, for maintaining phase coherence between said received signals; a combining means connected to said first and second receiving channels to receive the signals therefrom and produce a combined signal; and a primary phase-lock loop connected between said combining means and said receiving channels to insure phase lock of said received signals.

11. The diversity-locked combining system of claim 10, wherein said primary phase-lock loop and said independent secondary phase-lock loops include circuit parameters and wherein said circuit parameters are chosen such that said primary phase-lock loop responds faster to changes in said system than said secondary phase-lock loops, whereby a small phase difference instantaneously exists between the output signals from said secondary phase-lock loops until these loops correct for this phase difference and said primary phase-lock loops permit said system to track frequency changes common to said first and second receiving channels.

12. A diversity-locked combining system for receiving first and second radio frequency signals comprising: first and second receiving channels having said first and second radio frequency signals, respectively, applied thereto and having first and second intermediate frequency output signals, respectively, at their outputs thereof; a combining means connected to receive said first and second intermediate frequency output signals and for combining them to develop a combined intermediate frequency signal; a primary phase-lock loop connected to the output of said combining means and to said first and second receiving channels; first and second secondary phase-lock loops forming part of said first and second receiving channels, respectively, whereby said primary phase-lock loop insures phase lock of said system in accordance with the combined intermediate frequency signal applied thereto and said first and second secondary phase-lock loops maintain phase coherence between said first and second intermediate frequency output signals.

13. The diversity-locked combining system of claim 12, wherein said first and second receiving channels comprise first and second receiving means, respectively, for receiving said first and second radio frequency signals and producing first and second intermediate frequency output signals; and wherein said primary phase-lock loop comprises a phase comparison means connected to said combining means for generating an error voltage in accordance with the phase of said combined intermediate frequency signal, a voltage controlled oscillator connected to receive said error voltage and having the frequency of its output signal controlled thereby, and first and second heterodyning means connected to receive said output signal from said voltage controlled oscillator and said first and second output intermediate frequency signals from said first and second receiving means, respectively, and applying a first and second intermediate frequency output signal to said first and second secondary phase-lock loops, respectively, said first and second secondary phase-lock loops being connected to said combining means, whereby by the operation of said voltage controlled oscillator in accordance with said error voltage applied thereto said intermediate frequency output signals from said first and second heterodyning means are maintained at pre-determined frequencies.

References Cited

UNITED STATES PATENTS

| | | | |
|---|---|---|---|
| 2,951,152 | 8/1960 | Sichak et al. | 325—305 X |
| 2,955,199 | 10/1960 | Mindes | 325—305 |
| 3,195,049 | 7/1965 | Altman et al. | 325—305 |

KATHLEEN H. CLAFFY, *Primary Examiner.*

R. S. BELL, *Assistant Examiner.*